Aug. 8, 1933.   R. FERGUSON   1,921,352
BROODER HOUSE
Filed July 25, 1930   2 Sheets-Sheet 1
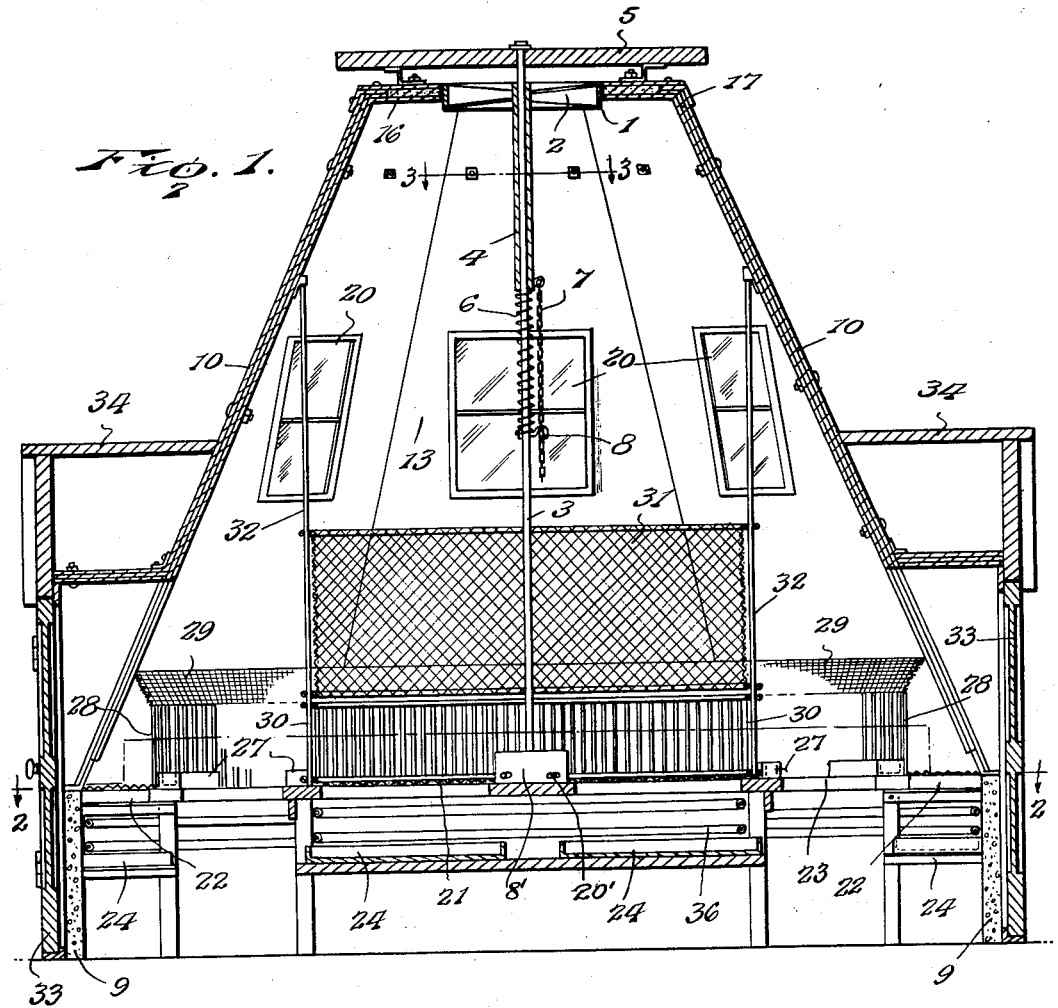
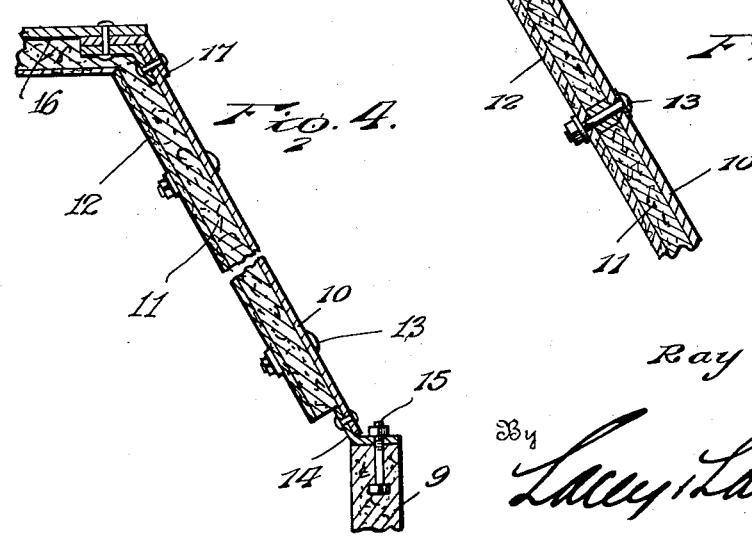
Inventor
Ray Ferguson.
By Lacey & Lacey,
Attorneys Aug. 8, 1933.  R. FERGUSON  1,921,352
BROODER HOUSE
Filed July 25, 1930  2 Sheets-Sheet 2

Inventor
Ray Ferguson.
By Lacey & Lacey,
Attorneys

Patented Aug. 8, 1933

1,921,352

UNITED STATES PATENT OFFICE 1,921,352

BROODER HOUSE

Ray Ferguson, Escatawpa, Miss.

Application July 25, 1930. Serial No. 470,736

7 Claims. (Cl. 119—31)

The invention is concerned with an improvement in the form and the arrangement of a structure intended to house, confine, sustain and control the movements of a very large number of delicate young fowl, or chicks, when received direct from the incubator hatchery and reared under artificial conditions.

One of the principal objects of the invention is the provision of a structure which will prevent the transmission of infectious germs causing white diarrhea, cholera, and other poultry diseases within the brooder house and to overcome other difficulties and hazards incident to baby chicks when reared in very large numbers under artificial conditions, and to provide a structure for use as a brooder house wherein the form and arrangement of the structure creates an environment exceptionally favorable for the preservation of life, prevention of disease and debility, and the promotion of health and growth of the baby chick occupants and, by thus decreasing debility and mortality and promoting health and growth, to increase the profits of the poultry raiser.

These objects are attained by providing a structure of pyramidal outline, the plan and arrangement of which provides within the quarters occupied by the baby chicks, for a proper supply of and the proper utilization by the individual chick, of warmth, sunlight, fresh air, sanitation, food and drink, and the control of each of these vital factors with a minimum of attention by the caretaker, and in such manner that each individual chick is afforded the use of each of the above enumerated vital factors in the state and to the degree recognized as the most beneficial for life, health and growth, and, at the same time, is protected from the baneful influence of excessive heat or cold, foul air, or foul quarters, food or drink. In the environment created and maintained within the living quarters by this invention, no more reliance is placed upon the baby chick to instinctively select the beneficial from the harmful than is given a human infant of like immature development.

While the drawings illustrate a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is a vertical, central sectional view of a brooder house embodying the invention, on the line 1—1 of Figure 2, looking in the direction indicated by the arrows.

Figure 4 is an enlarged fragmentary sectional view of a side portion of the brooder house.

Figure 5 is an enlarged fragmentary sectional view of part of a side wall.

Corresponding and like parts are referred to in the following description and designated in the several views of the drawings by like reference characters.

Figure 2:
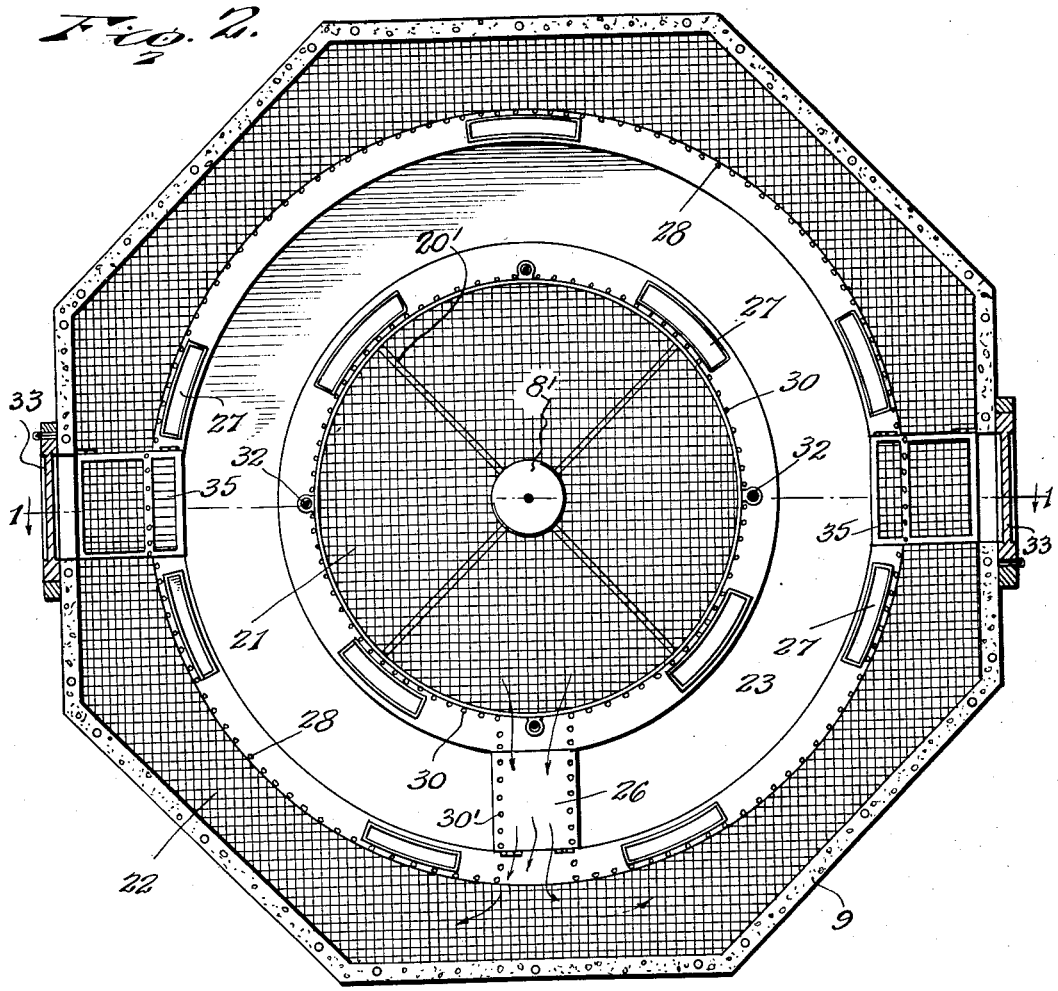
Figure 2 is a horizontal sectional view on the line 2—2 of Figure 1.

A brooder house constructed in accordance with this invention is approximately of pyramidal outline and comprises a substructure preferably of concrete and a superstructure including side walls comprising a metal frame, a sheet metal covering, and a lining of insulating material. The enclosing walls of the substructure are vertical whereas the walls of the superstructure incline upwardly and inwardly and are connected to a ceiling in which is formed a centrally disposed circular opening 1 which both admits air and provides an escape for foul air. A draft regulator 2 snugly fits within the opening 1 and is adjustable vertically to control the ingress of fresh air and the egress of warm and vitiated air. The draft regulator 2 consists of a ring or band connected to a sleeve 4 which is slidably mounted upon a centrally disposed shaft 3. The regulator operates between the ceiling of the house and a roof 5 which is supported upon and spaced from the ceiling. An open helical spring 6 mounted upon the shaft 3 normally exerts an upward pressure on the sleeve 4 to hold the regulator against the roof 5 to prevent passage of air through the opening 1 into or out from the house. A chain 7 is connected to the sleeve 4 and is adapted to engage a hook 8 or like part carried by the shaft 3 to hold the regulator in the required adjusted position. In this manner, the draft regulator is adapted to be set by hand. If preferred, a thermostat 8' may be employed to automatically control the ventilation by adjustment of the draft regulator 2 in a manner well understood in brooder structures.

Figure 3:
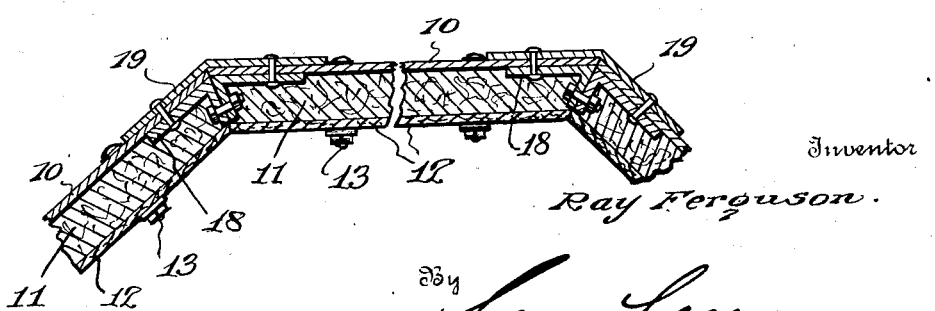
Figure 3 is an enlarged fragmentary sectional view on the line 3—3 of Figure 1.

The circumscribing wall 9 of the substructure is preferably concrete and of polygonal outline, depending upon the number of sides embodied in the structure. As shown, the structure is of octagonal formation, the sides of the superstructure resting upon the walls 9 and being secured thereto, as indicated most clearly in Figure 4 of the drawings. The upper side walls include a metal framing of angle bars, a covering of sheet metal, a filler 11 of insulating material, and a lining 12 of wood. As indicated most clearly in Figure 5 of the drawings, the sheet metal covering 10, lining 12, and insulation 11, are connected by means of bolts 13 upon which are mounted spacers to hold the covering 10 and lining 12 apart the required distance. Angle bars 14 rest upon the walls 9 and are anchored thereto by bolts 15. The lower ends of the upper side walls are riveted or otherwise secured to the angle irons 14. The upper ends of the side walls are secured to the ceiling 16 by means of angle bars 17. Angle bars 18 are provided at the meeting edges of the sides 10 and are bolted, as indicated most clearly in Figure 3 of the drawings. Cap strips 19 extend over the joints formed between the adjacent edges of the side walls, thereby resulting in a substantial and tight joint between the side walls. Windows 20 are provided in the upper side walls and are designed solely for the transmission of sunlight and make no provision for ventilation. These windows allow for penetration and diffusion of the ultra-violet sun rays and their utilization within the structure at all times from sunrise to sunset.

A floor subdivides the superstructure from the substructure and comprises a central portion 21 and an outer portion 22. The central portion 21 is preferably of circular outline. A substantially annular space 23 separates the floor sections 21 and 22 and constitutes a passageway for a caretaker to service the chicks. The floor sections 21 and 22 consist of wire netting or analogous openwork to admit of refuse, chick droppings and other matter escaping readily, to be subsequently removed, thereby preventing contraction and transmission of disease from one chick to others. Trays 24 are suitably supported below the respective floor sections 21 and 22 to catch the droppings to admit of removal thereof from time to time, as desired, to insure sanitary conditions.

A hinged bridge 26 spans the passageway 23 and connects the floor sections 21 and 22 so that the chicks may pass from the central section 21 to the outer section 22 as indicated by the arrows in Figure 2 of the drawings. Spaced vertical bars 30' are preferably arranged on opposite sides of the bridge 26 to confine the chicks thereon when passing from the inner to the outer sections. Troughs 27 are located at the sides of the passageway 23 and contain food and drink.

A grill 28 is located about in line with the inner side of the runway or floor section 22 and extends vertically a short distance to admit of chicks readily reaching the outer troughs from the runway 22. A screen guard 29 connects the top of the grill 28 with sides 10 of the superstructure. It will thus be understood that the chicks occupying the runway 22 are confined thereto but may readily obtain food and drink. A vertically movable grill 30 is located at the outer edge of the floor section 21 and extends vertically a short distance. A vertically movable screen guard 31 is located above the grill 30 and serves to confine the chicks to the floor section 21. Radial bars or braces 20' preferably connect the grill 30 and thermostat 8' so as to center the latter within the inner section. Vertically disposed guide rods 32 retain the guard 31 and grill 30 in position, said guard and grill being provided with guide loops or eyes through which the vertical guide rods 32 pass.

Doorways are provided for ingress to and egress from the brooder house. These doorways are closed by doors 33. The doorways are located for convenience, at opposite points and extend through lower portions of the superstructure and are closed by gables 34. Sections of the runway 22 in line with the doorways are movable, as indicated at 35, and are preferably hinged to turn aside to admit of a person entering or leaving the brooder house, as will be readily appreciated.

The brooder house may be heated in any determinate manner and, as indicated, radiators 36 are provided and may be supplied with hot water or steam from a suitable source. When the draft regulator 2 is elevated to extend across the space formed between the roof 5 and ceiling 16, passage of air is cut off. When the regulator 2 is lowered, fresh air from the outside enters the structure and foul air passes off therefrom. The provision of the floor sections 21 and 22 admits of separating the chicks as may be desired, and communication between the sections may be maintained by closing the bridge 26. The doorways and passageway 23 provide convenient means for caring for the chicks. Should the trays 24 be omitted, the droppings may be readily removed from the structure designed to receive and support said trays.

What is claimed is:

1. A brooder house including an enclosed runway for the chicks, and a passageway within the runway, the latter having a movable section, and a doorway in connection with said passageway and in line with the movable section of the runway.

2. A brooder house having a runway adjacent the enclosing walls, and having a passageway interior of the runway, a grill separating the runway from the passageway, a movable section in the runway giving access to the passageway, and troughs adjacent the passageway and readily accessible therefrom for servicing and separated from the runway by the said grill.

3. A brooder house comprising a centrally disposed floor, an outer floor section spaced from the center floor section to provide an intermediate passageway, the outer floor section having a movable section to give access to the passageway, grills at the sides of the passageway, guards at the tops of the grills, and troughs at the sides of the passageway and separated from the floor sections by the grills.

4. A brooder house comprising a substructure and a superstructure of polygonal outline and having the side walls of the superstructure inclining upwardly and inwardly and provided with windows, the floor being in line with the juncture of the substructure and superstructure and comprising a central portion and outer portion separated by an approximately circular passageway, grills and screen guards at the sides of the passageway, and having doorways opening from the passageway, the outer floor section having movable parts in line with the doorways, and troughs adjacent said passageway, the floor sections being of openwork for the ready discharge of refuse matter.

5. A brooder house comprising an elevated central floor section, an outer floor section in the plane of the central floor section and spaced therefrom to define a passageway for attendants, the walk for said passageway being at a lower level than the floor sections, and a bridge connecting the floor sections across the passageway, the outer floor section having a movable portion giving access to the passageway.

6. A brooder house comprising an elevated central floor section, and an outer floor section in the plane of the central floor section and spaced therefrom to define a passageway for attendants, the walk for said passageway being at a lower level than the floor sections, the outer floor section having a movable portion giving access to the passageway from outside the brooder house.

7. A brooder house having a centrally disposed floor and a substantially circular passageway exterior thereto, a vertically movable grill separating the passageway from the floor and provided with lateral guide loops, a vertically movable guard disposed above and in vertical alinement with the grill and provided with lateral guide loops, and vertically disposed guide rods extending through the guide loops of the grill and guard for guiding said grill and guard when raised or lowered.

RAY FERGUSON. [L. S.]